(12) United States Patent
Bensmann et al.

(10) Patent No.: US 9,408,397 B2
(45) Date of Patent: Aug. 9, 2016

(54) KNEADING APPARATUS FOR KNEADING AND MIXING DOUGH

(75) Inventors: Stefan Bensmann, Osnabrück (DE); Hashem Ghani, Osnabrück (DE); Gerrit Ackermann, Bissendorf (DE)

(73) Assignee: DIOSNA Dierks & Söhne GmbH, Osnabrück (DE)

( * ) Notice: Subject to any disclaimer, the term of this patent is extended or adjusted under 35 U.S.C. 154(b) by 85 days.

(21) Appl. No.: 13/996,620

(22) PCT Filed: Oct. 22, 2011

(86) PCT No.: PCT/EP2011/005335
§ 371 (c)(1),
(2), (4) Date: Sep. 11, 2013

(87) PCT Pub. No.: WO2012/084079
PCT Pub. Date: Jun. 28, 2012

(65) Prior Publication Data
US 2013/0343146 A1    Dec. 26, 2013

(30) Foreign Application Priority Data
Dec. 23, 2010   (DE) .......................... 10 2010 055 800

(51) Int. Cl.
*A21C 1/14*   (2006.01)
*A21C 1/06*   (2006.01)
(Continued)

(52) U.S. Cl.
CPC . *A21C 1/142* (2013.01); *A21C 1/06* (2013.01); *B01F 7/00125* (2013.01); *B01F 7/00141* (2013.01); *B01F 7/00583* (2013.01); *B01F 7/043* (2013.01)

(58) Field of Classification Search
CPC ..... B01F 7/00141; B01F 7/0025; B01F 7/043
USPC ......................................................... 366/76.1
See application file for complete search history.

(56) References Cited

U.S. PATENT DOCUMENTS 1,660,221 A * 2/1928 Dimm ................... B01F 7/0065
                                                               241/102
2,957,681 A   10/1960 Moultrie
(Continued)

FOREIGN PATENT DOCUMENTS

DE       33 33 733 A1    3/1984
DE       29517612        1/1996
(Continued)

*Primary Examiner* — Tony G Soohoo
*Assistant Examiner* — Elizabeth Insler
(74) *Attorney, Agent, or Firm* — Gudrun E. Huckett (57) ABSTRACT

The invention relates to a kneading apparatus for kneading and mixing dough, having a kneading chamber, discharge opening and an input. The kneading apparatus has at least two shafts to which tools which are arranged in the kneading chamber are fixed, wherein at least one of the tools is designed to convey dough from the input region, in the conveying direction, to the discharge opening. The rotation speeds of the two motor-driven shafts can be set and changed separately from one another with the aid of a control. The two shafts are fitted with tools in a different manner from each other in such a way that the conveying action of all the tools of one shaft differs from the kneading action of all the tools of the other shaft given the same rotation speed of the shafts in each case.

18 Claims, 8 Drawing Sheets

(51) Int. Cl.
  *B01F 7/00* (2006.01)
  *B01F 7/04* (2006.01)

(56) References Cited

U.S. PATENT DOCUMENTS

| | | | |
|---|---|---|---|
| 3,194,504 A * | 7/1965 | Entrikin | B01F 7/043 241/188.1 |
| 4,428,535 A | 1/1984 | Venetucci | |
| 4,655,701 A | 4/1987 | Moriya | |
| 5,810,476 A | 9/1998 | Müntener | |

FOREIGN PATENT DOCUMENTS

| | | | |
|---|---|---|---|
| DE | 19507181 | 9/1996 | |
| DE | 10 2007 011505 | 8/2008 | |
| DE | 102007011505 A1 * | 8/2008 | B01F 3/10 |
| EP | 1033163 | 9/2000 | |
| EP | 1192861 | 4/2002 | |
| FR | 2380066 | 9/1978 | |
| JP | 56-064750 | 6/1981 | |
| JP | 57-027121 | 2/1982 | |
| JP | S62-259539 A | 11/1987 | |
| JP | 11-179180 | 7/1999 | |
| JP | 2005 145 646 A | 6/2005 | |

\* cited by examiner

Fig. 8

KNEADING APPARATUS FOR KNEADING AND MIXING DOUGH

BACKGROUND OF THE INVENTION

The invention concerns a kneading apparatus for kneading and mixing dough, comprising a kneading chamber that is circumferentially at least section-wise delimited by a wall and has a discharge opening for discharging the kneaded dough from the kneading chamber and a feed inlet area for filling the kneading chamber with dough to be kneaded provided on a side of the kneading chamber that is facing away from the discharge opening. The kneading apparatus comprises moreover at least two shafts on which tools arranged in the kneading chamber are secured wherein at least one of the tools is configured to convey dough from the feed area in the conveying direction toward the discharge opening.

Such kneading apparatus are known as so-called continuous kneaders for producing dough in food technology. The kneading chamber is formed by a kneading trough in which two shafts furnished with kneading tools are rotating. The kneading tools knead the dough and convey it at the same time in the conveying direction. The common rotary speed of the two shafts can be increased or lowered in this context whereby the kneading process and also the conveying action of the dough in the conveying direction are changed. A disadvantage of such kneading apparatus is however that the kneading action of the apparatus on the one hand and the conveying action in the form of a volume stream of dough in the conveying direction on the other hand can be changed separate from each other only in that the kneading tools are exchanged for different kneading tools that, for example, transport the dough faster in the conveying direction to a discharge opening. Conversion of such an apparatus is however very complex.

The invention has the object to provide an apparatus of the aforementioned kind with which the kneading action on the one hand and the conveying action on the other hand can each be changed in a simple way.

SUMMARY OF THE INVENTION

The invention is solved by a kneading apparatus of the aforementioned kind in which the rotary speeds of the two motor-driven shafts are adjustable and changeable separate from each other by means of a control unit. Both shafts are moreover furnished differently relative to each other with tools such that the conveying action of the totality of the tools of the first shaft in the form of a volume stream of the dough located in the kneading chamber in the conveying direction and/or the kneading action of the totality of the tools of the first shaft in the form of a volume stream of the dough located in the kneading chamber in the direction toward the tools of the other shaft deviates from the conveying action and/or the kneading action of the totality of the tools of the second shaft for same rotary speed of the shafts. Theoretically, the action of the tools of each shaft is thus divided into components, respectively. A first component referred to as conveying action is defined by the extent to which the tools of a shaft are suitable to transport the dough located in the kneading chamber in the conveying direction. The second component referred to as kneading action is defined by the extent to which the tools of a shaft are suitable to move the dough located in the kneading chamber transversely to the conveying direction in the direction toward the tools of the other shaft, respectively. Only with this movement, by interaction with the tools of the other shaft, respectively, pushing, pulling and shearing actions on the dough result and thus the kneading action. Deviating conveying and kneading actions of the totality of the tools of the respective shafts can be realized in different ways. The shafts are preferably furnished with different tools wherein the conveying action and/or the kneading action of the different tools deviate from each other. However, the shafts can alternatively also be furnished with the same tools wherein on each shaft at least two different tools with deviating conveying and/or kneading action are arranged and the number of the respective tools or their distribution on the shafts deviates between them.

With this combination of separately adjustable rotary speeds of the shafts and the different conveying and/or kneading actions of the tools of the shafts, it is achieved that the kneading action and the conveying action as an important factor for the discharge output of the kneading apparatus can be adjusted separate from each other. For example, when the kneading action is to be increased while the conveying action is to stay the same, the rotary speed of that shaft is increased that is provided with tools that as a whole have a higher kneading action than the tools of the other shaft. In order to be able to keep the conveying action and thus indirectly also the discharge output of the apparatus as a whole constant at the existing level, at the same time the rotary speed of the other shaft is optionally reduced until the original conveying action is reached again which is the result of the summation of the conveying action of all tools located in the kneading chamber at the respective rotary speeds of the shafts.

By means of the control unit, the rotary speeds of the two shafts can be adjusted advantageously such that the conveying action remains below the maximum possible discharge output of the kneading apparatus that is defined by the size of the discharge opening and by the removal of the dough that is already passing through the discharge opening. Kneading in the kneading chamber and the discharge are carried out substantially pressureless. In this way, particularly advantageous rheological properties of the dough that is exiting from the kneading apparatus are achieved.

The first shaft and the tools secured thereon are moreover arranged within an imaginary cylinder envelope on which the inner edges of the tools secured on the second shaft and pointing toward the first shaft are circulating during a rotation about the axis of the second shaft. During a rotational movement of the second shaft and of the tools arranged thereat, a cylindrical area located about the axis of rotation of the second shaft is not passed through by the tools of the second shaft. In this imaginary cylinder the first shaft as well as the tools secured thereat are arranged. During rotational movements of the two shafts the tools of the first shaft move within an area which is free of the tools of the second shaft. On the other hand, the tools of the second shaft circulate about the tools of the first shaft during a rotation. In a preferred embodiment of the invention, the axis of rotation of the first shaft is coinciding with the axis of rotation of the second shaft. However, when outside of the kneading chamber an eccentric screw pump is connected to the discharge opening for improved transport of the dough exiting from the discharge opening away therefrom, which pump is in addition not driven by its own shaft but by the first shaft, the axis of rotation of the first shaft is circulating on a repeating path about the axis of rotation of the second shaft.

Further advantageous embodiments of the invention can be taken from the dependent claims.

Advantageously, the deviation of the conveying action of the totality of the tools of the second shaft is more than twice as high, in particular more than nine times as high, as the conveying action of the totality of the tools on the first shaft for identical rotary speed. It is particularly preferred that the totality of the tools of the second shaft alone has in summation a conveying action. With these embodiments, it is achieved respectively that by an increased rotation of the second shaft the conveying action in the form of a volume stream of the dough located in the kneading chamber is increased in the conveying direction. In reverse, the kneading action of the apparatus as a whole can be increased in that the rotary speed of the first shaft is increased. A complicated exchange of the tools located on the shafts is no longer required for this purpose.

Advantageously, the second shaft comprises supports arranged parallel to the conveying direction and spaced at a regular spacing relative to each other on which the tools of the second shaft are secured. The second shaft comprises also a first circular fixation element and a further circular fixation element on which the supports of the second shaft are secured. The first shaft is guided through the circular center point of the first circular fixation element and is not secured relative to it. The two shafts have moreover preferably opposite rotational directions. With the aforementioned configurations, it is achieved that the kneading action and the conveying action, independent from each other can be varied in a simple way by variation of the rotary speed of the two shafts.

In an especially preferred embodiment of the invention, the tools of the first shaft are formed by a plurality of paddles with a paddle surface that during a rotation of the first shaft is moving the dough located in the kneading chamber. In this connection, the paddles are arranged displaced relative to each other along the first shaft and the movement paths of the paddle surfaces of two neighboring paddles partially overlap each other during a rotation about the axis of the first shaft. With this configuration, a dead space within which dough may collect is prevented.

Each paddle surface in this context is preferably embodied to be positioned to at least 90% in a paddle surface plane. The paddles can be particularly simply and solidly configured in this way.

In another preferred embodiment of the invention, the paddle surfaces are arranged to at least 90% parallel to the axis of rotation of the first shaft. In this way, it is achieved that the conveying action of the paddles is embodied only weakly. It is particular preferred that the paddle surfaces are arranged even completely parallel to the axis of rotation of the first shaft. The paddles have in this case no conveying action and only purely a kneading action in that the dough is driven toward the tools of the second shaft.

Advantageously, the paddle surface has an outer terminal edge which is facing the tools of the second shaft and an oppositely positioned inner terminal line. A first beam originating radially from the axis of the first shaft and touching the inner terminal line is positioned at an angle of 90 degrees to 60 degrees relative to the paddle surface plane and a further radial beam touching the outer terminal edge is positioned at an angle between 0 degrees and 35 degrees relative to the paddle surface plane. With this configuration, the paddles are particularly suitable as kneading tools which drive the dough toward the tools of the second shaft. When the individual paddles are configured as separate components in this context, the inner terminal line is formed by an inner terminal edge.

Advantageously, the tools of the second shaft are formed by a plurality of conveying kneading segments each having a working surface that, during rotation of the second shaft, moves dough located in the kneading chamber; the working surfaces are arranged along the shaft so as to be displaced relative to each other. In this connection, the movement paths of the working surfaces of two neighboring conveying kneading segments during a rotation about the axis of the second shaft overlap each other at least partially. With this configuration, it is achieved that no dead space in which dough may deposit inadvertently can be generated between individual conveying kneading segments.

Preferably, the working surface of each conveying kneading segment to at least 90% is positioned within a conveying kneading segment plane. It is particularly preferred that the working surface of each conveying kneading segment is positioned completely in the conveying kneading segment plane. This is the case in an advantageous embodiment of the invention in which the conveying kneading segment is made of flat steel. With this configuration, independently of each other it is achieved that the dough can be particularly effectively conveyed in the conveying direction and on the other hand can be pushed toward the tools of the first shaft for obtaining an excellent kneading action. Between the conveying kneading segments and the tools of the first shaft, the dough is moved back and forth and moreover is sheared and mixed.

In a particularly preferred embodiment of the invention, each conveying kneading segment has an inner terminal edge which is facing the tools of the first shaft and an outer terminal edge which is oppositely positioned thereto and is facing the wall of the kneading space. In this connection, both terminal edges are of an arc-shaped configuration such that the conveying kneading segments in a projection onto a cross-sectional plane that is extending perpendicularly to the axis of rotation of the second shaft has the form of a sector of a circular ring with a circular center point and a circular arc-shaped inner and outer terminal edge. Particularly preferred, the terminal edges have the shape of a section of an ellipse. In this way, independently of each other it can be also prevented that in the area of the tools of the second shaft dead space is generated in which dough may deposit inadvertently.

Advantageously, the working surfaces of the conveying kneading segments relative to the axis of rotation of the second shaft are inclined such that a first angle of attack between the axis of rotation of the second shaft and a first beam is between 90 degrees and 60 degrees, wherein the first beam, in a projection onto a cross-sectional plane that is extending perpendicularly to the axis of rotation of the second shaft, is originating from this axis of rotation and is positioned in the conveying kneading segment plane of the corresponding conveying kneading segment at the end of the working surface that is facing away from the discharge opening. Moreover, a further angle of attack between the axis of rotation of the second shaft and a further beam is 30 degrees to 75 degrees, wherein the further beam, in the projection onto a cross-sectional plane that is extending perpendicular to the axis of rotation of the second shaft originates from this axis of rotation and is positioned in the conveying kneading segment plane of the corresponding conveying kneading segment. In this connection, the beam center angle between the first beam and the second beam in the projection of the beams onto the cross-sectional plane is 45 degrees to 90 degrees. With this decrease of the angle of attack it is achieved that dough which is entrained by a conveying kneading segment is first moved increasingly in the conveying direction and only to a limited extent in the direction toward the first shaft. With continued rotation of a conveying kneading segment the angle of attack gradually decreases so that the conveying action of the conveying kneading segment also decreases and the movement of dough in the direction toward the tools of the first axis of rotation increases. The continuous change of the angle of attack in this connection causes sort of a folding of the dough in the direction toward the tools of the first shaft which leads rheologically to a particularly well kneaded dough.

Advantageously, the conveying kneading segments are shaped and arranged such that the ratio of the conveying action of the totality of the conveying kneading segments relative to their kneading action is 1 to 5 and in particular 2.5 to 3.5. It has been found that these ratios are particularly suitable in order to adjust, separate from each other, the conveying action and thereby indirectly the discharge output of the kneading apparatus on the one hand and the kneading action on the other hand.

Preferably, the ratio of the summation of the working surfaces of the conveying kneading segments in a projection onto a cross-sectional plane perpendicular to the conveying direction relative to the summation of the paddle surfaces of the paddles is 0.2 to 1.1 and in particular 0.7 to 0.9. It has been found that especially by providing such ratios conveying action and kneading action of the apparatus as a whole are changeable and adjustable particularly well.

Advantageously, a projection of the paddle surfaces onto a plane perpendicular to the conveying direction during a complete rotational movement about the axis of rotation of the first shaft results in the shape of a circular ring. The ratio of the summation of the working surfaces of the conveying kneading segments in a projection onto this plane perpendicular to the conveying direction relative to the surface of the circular ring is in this context 0.2 to 1.1 and in particular 0.7 to 0.9. It has been found also in this context that particularly by providing such ratios conveying action and kneading action of the apparatus as a whole are changeable and adjustable particularly well.

Advantageously, the minimal spacing between the paddles and the conveying kneading segments is 1.5 mm to 15.0 mm and preferably 5.0 mm to 10.0 mm. With this configuration, the apparatus is capable of kneading a great variety of different doughs without the tool or even shafts of the apparatus having to be exchanged.

In a preferred embodiment of the invention, the second shaft has supports arranged parallel to the axis of rotation of the second shaft on which the tools of the second shaft are secured. At least one of the supports has additionally a follower surface that in the rotational direction of the second shaft is facing the dough and in cross-section of the support is planar or has a vane-like curvature. With this configuration of the supports it is achieved that dough located at the bottom of the kneading chamber is engaged by the support, is entrained in circulation, and is then released at the side opposite the bottom of the kneading chamber so as to fall onto the tools of the first shaft. The kneading and also the conveying action are improved in this way as a whole.

BRIEF DESCRIPTION OF THE DRAWINGS

Further details and advantages of the invention are disclosed in the dependent claims and the schematic embodiment described in the following. It is shown in:

DESCRIPTION OF PREFERRED EMBODIMENTS

In the following, same acting elements of the kneading apparatus, inasmuch as meaningful, are provided with same reference numerals. Of course, the features of the embodiment of the kneading apparatus according to the invention disclosed in the following can also be the subject matter of the invention in other combinations.

Figure 1:
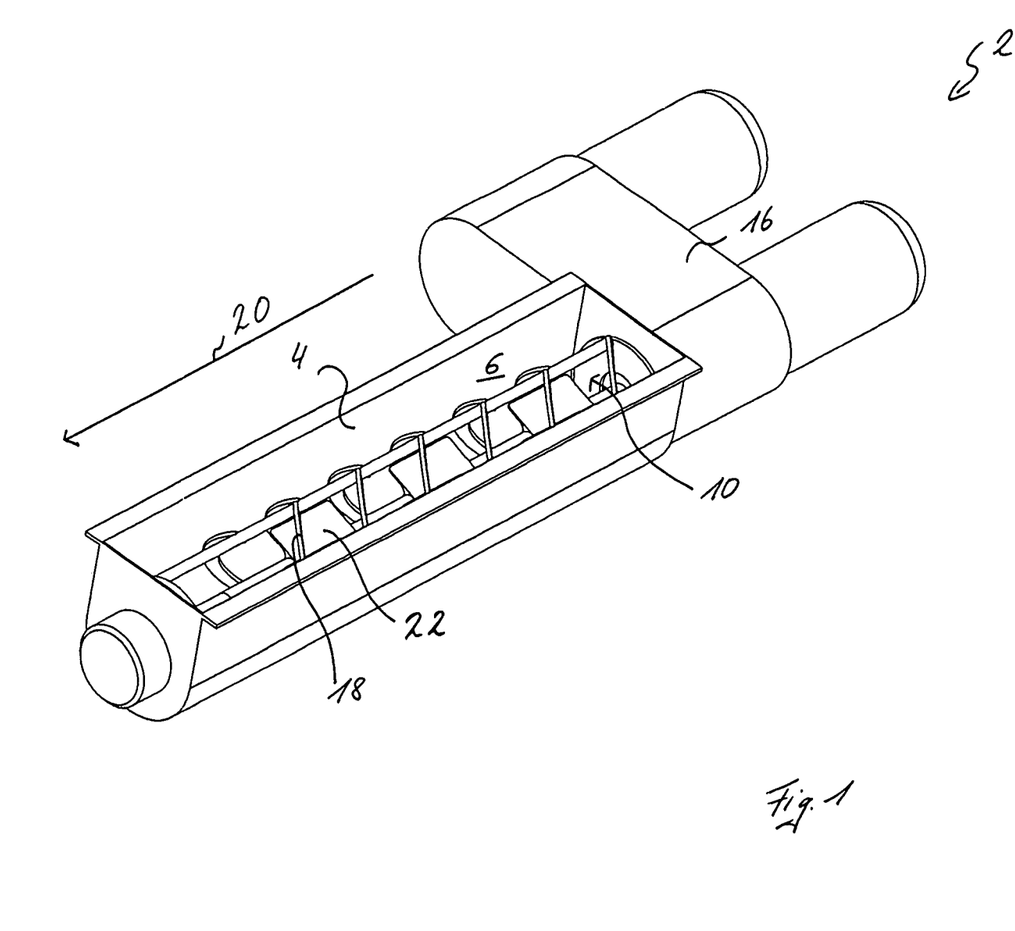
FIG. 1 a three-dimensional illustration of a kneading apparatus according to the invention.
Figure 2:
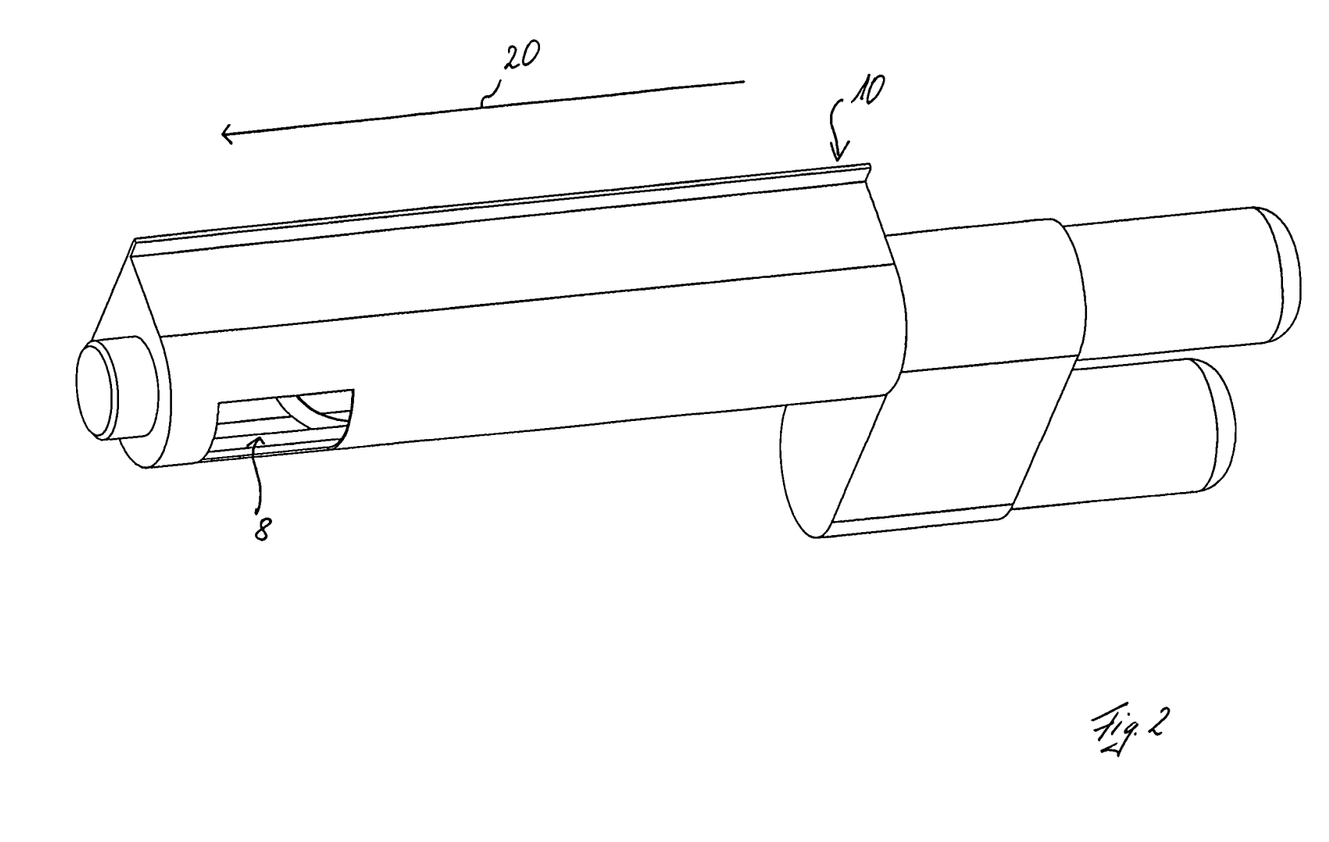
FIG. 2 the apparatus of FIG. 1 in another three-dimensional illustration.
Figure 3:
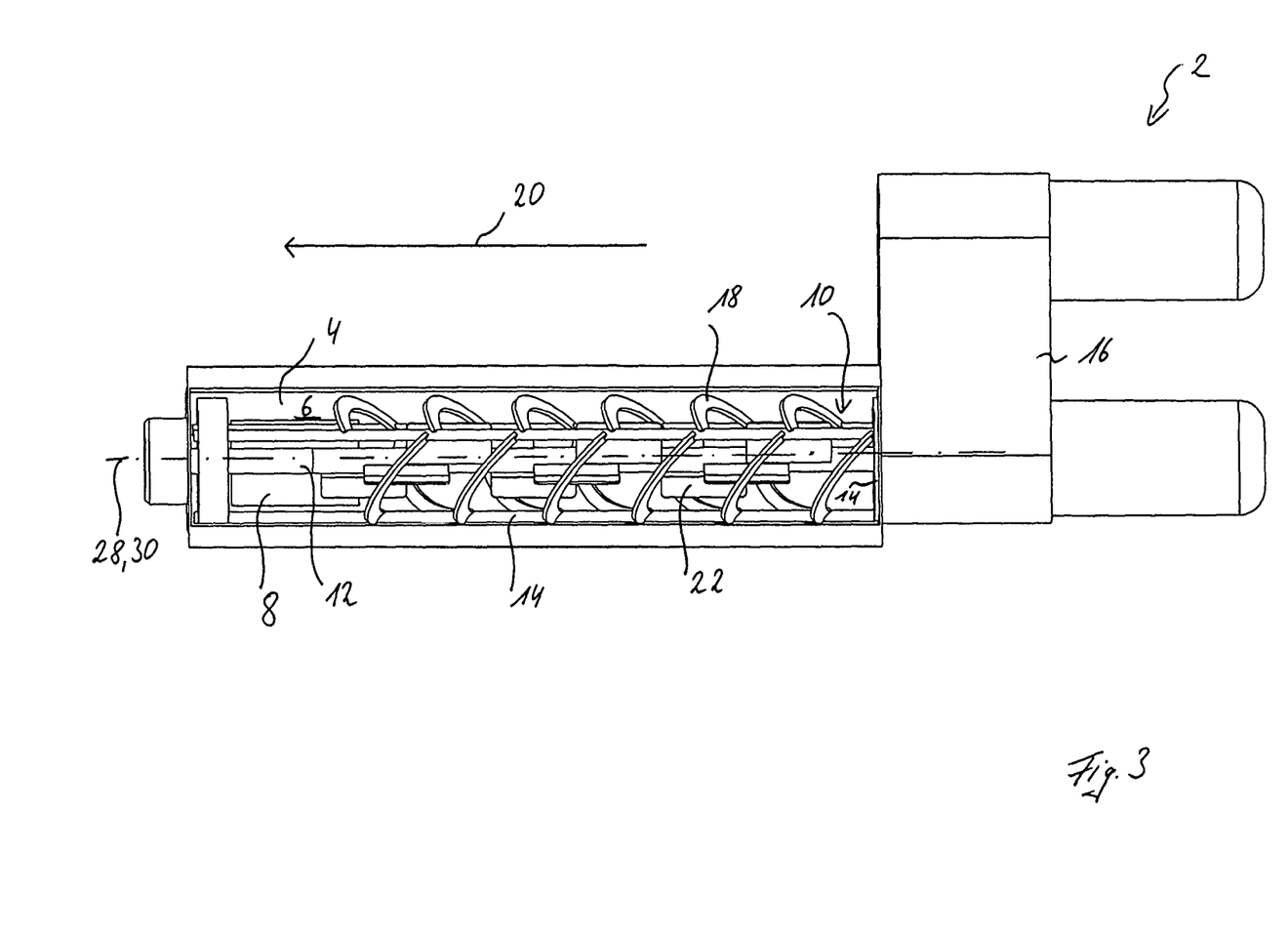
FIG. 3 the apparatus of FIG. 1 in a further three-dimensional illustration.

FIG. 1 to FIG. 3 show a kneading apparatus 2 according to the invention in different three-dimensional illustrations. The kneading apparatus 2 comprises a kneading chamber 6 which is circumferentially delimited section-wise by a wall 4 and comprises a discharge opening 8 illustrated in FIG. 2 for discharging the kneaded dough from the kneading chamber 6 and a feed area 10 for filling the kneading chamber 6 with the dough to be kneaded, wherein the feed area 10 is arranged on the side of the kneading chamber 6 which is facing away from the discharge opening 8. The kneading apparatus 2 comprises moreover a first shaft 12 and a second shaft 14 which are illustrated in detail in FIGS. 4 and 5. The rotary speeds of the two motor-driven shafts 12, 14 are adjustable and changeable by means of a control unit 16 separate from each other.

The second shaft 14 is furnished with conveying kneading segments 18 which are designed to convey the dough from the feed area 10 on the side of the kneading chamber 6 which is facing away from the discharge opening 8 in the conveying direction, illustrated by the arrow 20, to the discharge opening 8. The side facing away is to be understood as the side of the kneading chamber 6 where the shaft 14 with the conveying kneading segments 18 that are suitable for the conveying action begins. The feed area 10 and the discharge opening 8 are thus spaced apart from each other as far as possible in order to process the dough across a path that is as long as possible in the conveying direction 20 within the kneading chamber 6.

Figure 4:
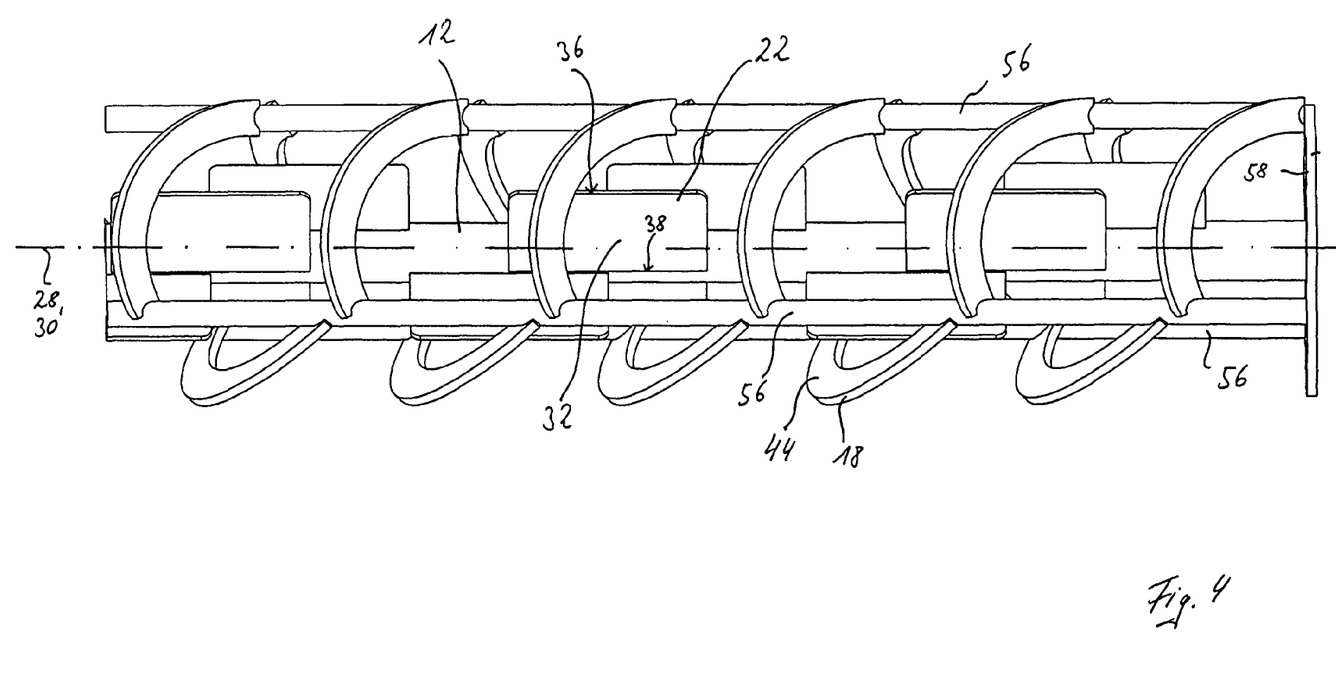
FIG. 4 the apparatus of FIG. 1 in a detail view, showing only the shafts of the apparatus.
Figure 5:
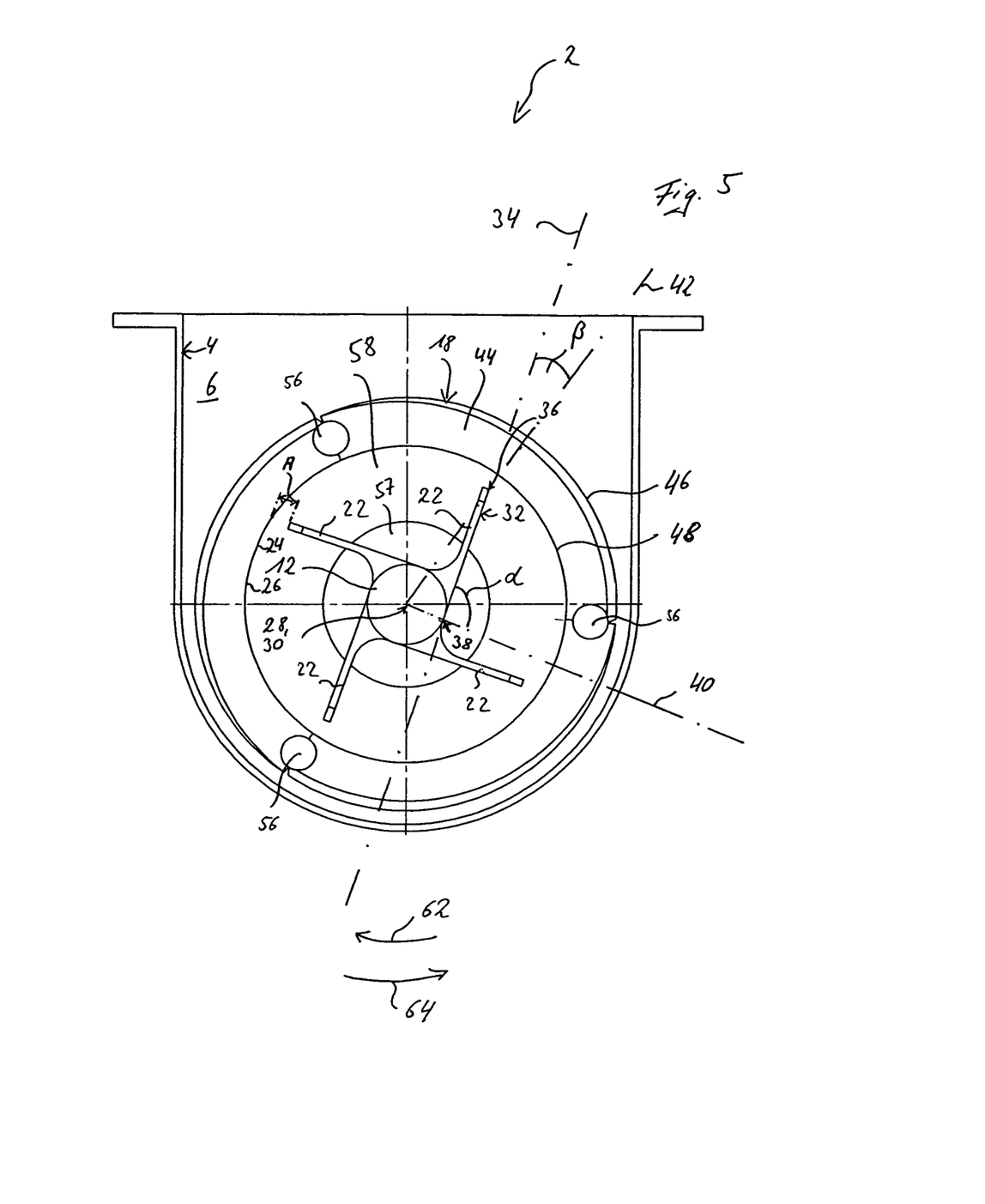
FIG. 5 a detail view of a cross-section of the kneading apparatus of FIG. 1.
Figures 6A, 6B:
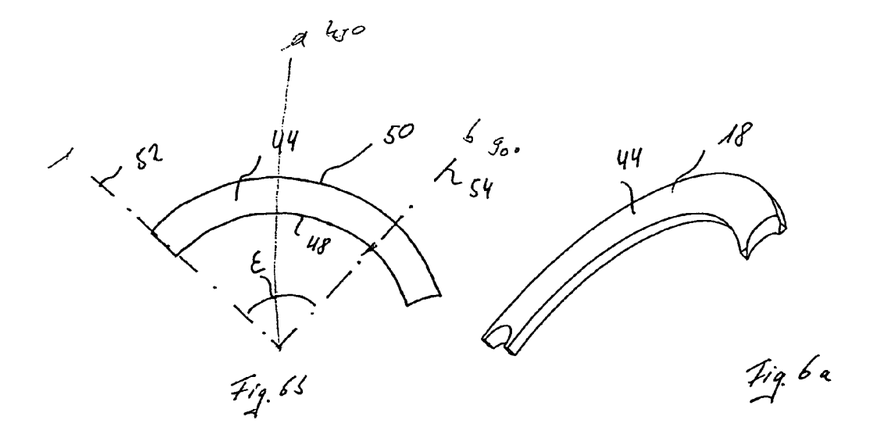
FIG. 6a to FIG. 6g different detailed views of a conveying kneading segment of the kneading apparatus according to FIG. 1.
Figures 6C, 6G:
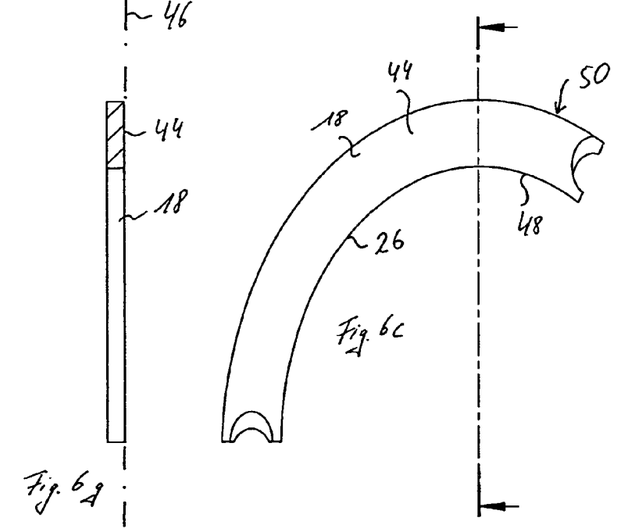
Figure 6D:
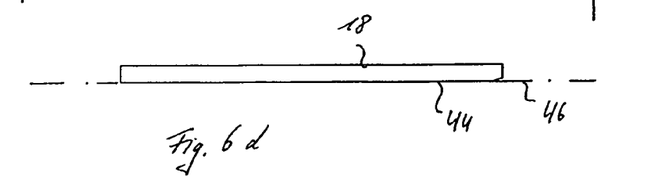
Figure 6E:
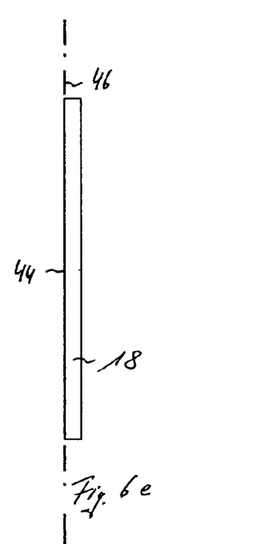
Figure 6F:
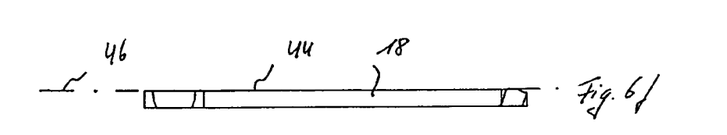

As can be seen in particular in FIG. 4 and FIG. 5, the first shaft 12 is furnished exclusively with paddles 22 as tools and the second shaft 14 is furnished exclusively with conveying kneading segments 18. The first shaft 12 and the paddles 22 secured thereon are arranged within an imaginary cylinder envelope 24 on which the inner edges 26 of the conveying kneading segments 18 that are pointing toward the first shaft 12 are circulating during a rotation about the axis 28 of the second shaft 14. In the present embodiment, the axis of rotation 28 of the second shaft 14 is identical to the axis of rotation 30 of the first shaft 12.

The paddles 22 each have a paddle surface 32 that during a rotation of the first shaft 12 moves the dough located in the kneading chamber 6. As can be seen in particular in FIG. 4, the paddles 22 are arranged displaced relative to each other along the first shaft 12 and the movement paths of the paddle surfaces 32 of neighboring paddles 22 overlap each other during a rotation about the axis 30 of the first shaft 12. Each paddle surface 32 is embodied to at least 90%, in the illustrated embodiment even completely, so as to be positioned within a paddle surface plane 34. The paddle surfaces 32 are moreover arranged to at least 90%, in the embodiment even completely, parallel to the axis of rotation 30 of the first shaft 12.

Each paddle surface 32 has an outer terminal edge 36 facing the conveying kneading segments 18 and an inner terminal line 38 positioned opposite thereto. As illustrated in FIG. 5, a beam 40 which is originating radially from the axis 30 of the first shaft 12 and touches the inner terminal line 38 is positioned at an angle α of 90° to 60° relative to the paddle surface plane 34. A further beam 42 which is originating from the axis 30 of the first shaft 12 and touching the outer terminal edge 36 is positioned moreover at an angle β between 0 degrees and 35 degrees relative to the paddle surface plane 34.

FIG. 4 and FIG. 5 show that the conveying kneading segments 18 each have a working surface 44. The conveying kneading segments 18 are arranged along the second shaft 14 so as to be displaced relative to each other wherein the movement paths of the working surfaces 44 of two neighboring conveying kneading segments 18 overlap at least partially during a rotation about the axis 28 of the second shaft 14. The working surface 44 of each conveying kneading segment 18 is positioned to at least 90%, in the embodiment even completely, within a conveying kneading segment plane 46. The conveying kneading segment plane 46 can be seen in FIGS. 6a to 6g.

FIG. 5 shows a cross-section of the kneading apparatus 2 according to the invention in a detail view. From this illustration, it is apparent that each conveying kneading segment 18 is delimited by an inner terminal edge 48 which is facing the paddles 22 and an outer terminal edge 50 oppositely positioned thereto and facing the wall 4 of the kneading chamber 6. Both terminal edges 48, 50 are designed with an arc shape such that the conveying kneading segments 18 in a projection onto a cross-sectional plane which is extending perpendicularly to the axis of rotation 28 of the second shaft 14, which in the embodiment corresponds to the paper plane, has the shape of a sector of a circular ring with a circular center point and inner and outer terminal edges 48, 50 that are circular arc shaped. The circular center point in this connection is identical to the axis of rotation 28 of the second shaft 14. FIG. 6b shows once again an isolated conveying kneading segment 18 rotated in such a way as it appears in a projection onto the aforementioned cross-sectional plane.

Figure 7:
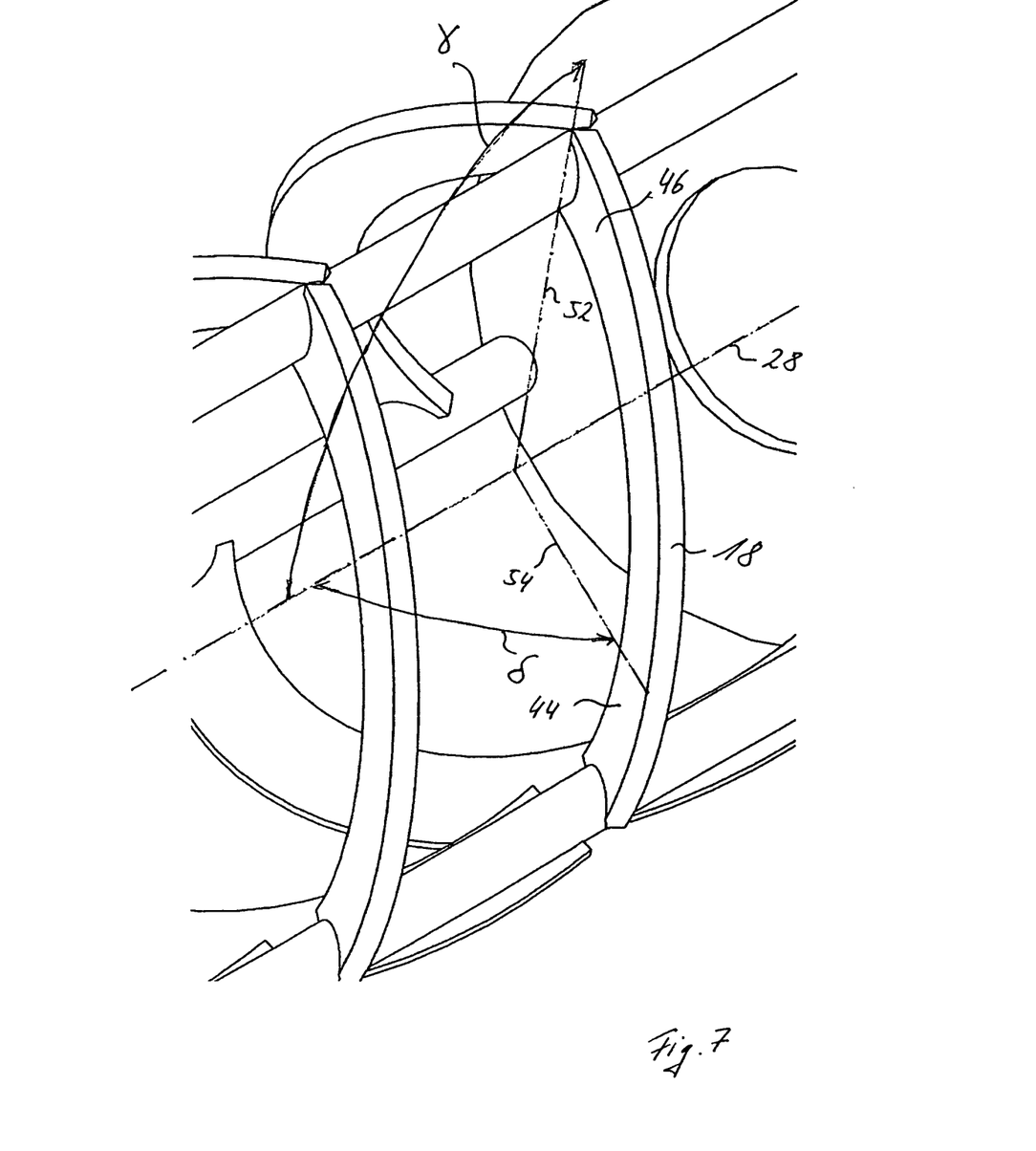
FIG. 7 a detail view of the shafts of FIG. 1.

As can be seen in FIG. 7, the working surfaces of the conveying kneading segments 18 relative to the axis of rotation 28 of the second shaft 14 are arranged at an incline such that a first angle of attack γ between the axis of rotation 28 of the second shaft 14 and a first beam 52 is between 90 degrees and 60 degrees, wherein the first beam, in a projection onto a cross-sectional plane extending perpendicularly to the axis of rotation 28 of the second shaft 14, is extending away from this axis of rotation 28 and is positioned in the conveying kneading segment plane 46 at the end of the conveying kneading segment 18 facing away from the discharge opening 8. A further angle of attack δ between the axis of rotation 28 of the second shaft 14 and a further beam 54 is 30 degrees to 75 degrees, wherein the further beam, in a projection onto a cross-sectional plane perpendicular to the axis of rotation 28 of the second shaft is originating from this axis of rotation 28 and is positioned in the conveying kneading segment plane 46. In this context, the first beam 52 and the second beam 54, in a projection of the beams 52, 54 onto the cross-sectional plane, are positioned at a beam center angle ε of 45 degrees to 90 degrees.

The minimal spacing A between the paddles 22 and the conveying kneading segments 18 is 1.5 mm to 15.0 mm and preferably 5.0 mm to 10.0 mm, as can be seen in FIG. 5.

Figure 8:
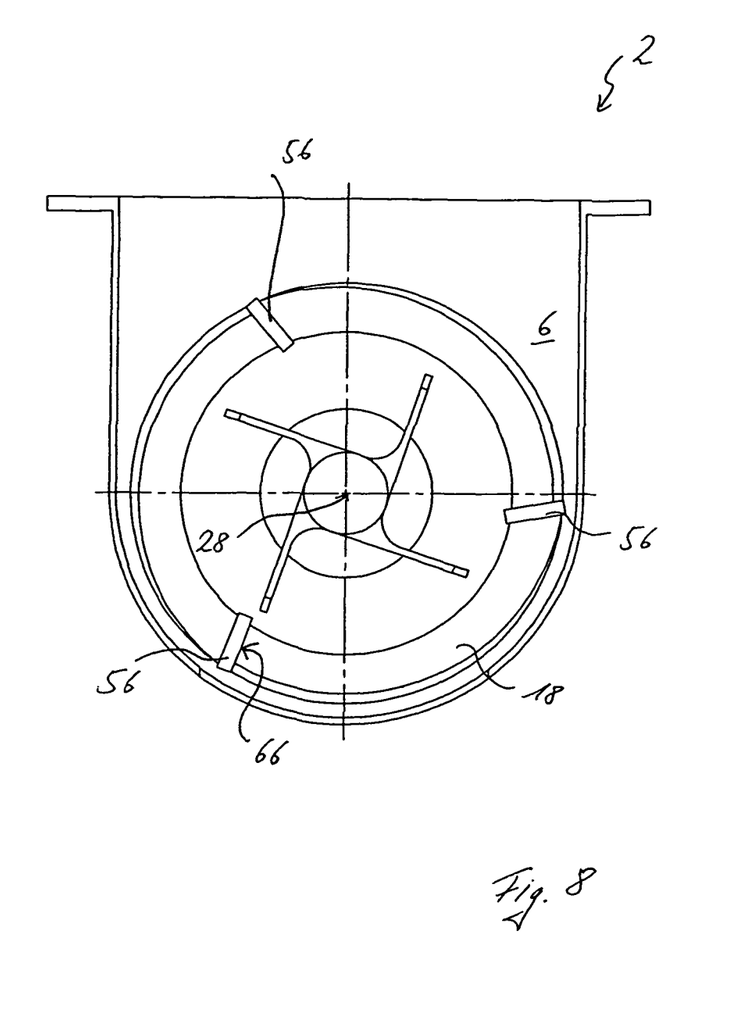
FIG. 8 a detail view of a cross-section of a further kneading apparatus according to the invention.

As can be seen in FIG. 4 and FIG. 5, the second shaft 14 has three supports 56 arranged parallel to the conveying direction 20 and spaced regularly relative to each other on which the conveying kneading segments 18 are secured. The second shaft 14 has moreover at least one circular fixation element 58 on which the supports 56 of the second shaft 14 are secured. The first shaft 12 is passed through a recess 57 of the circular fixation element 58 and is not secured relative thereto. The two shafts 12, 14 have moreover opposite rotational directions, illustrated in FIG. 5 for the first shaft 12 by a round arrow 62 and for the second shaft 14 by a further round arrow 64. The supports 56 can be, in cross-section, of a round configuration in order to facilitate their cleaning. They can however have a follower surface 66 which is facing the dough in the rotational direction 64 of the second shaft 14 and which, in cross-section of the support 56, is of a planar configuration, as illustrated in FIG. 8, or has a vane-shaped curvature.

Reference Numerals 2 kneading apparatus
4 wall
6 kneading chamber
8 discharge opening
10 feed area
12 first shaft
14 second shaft
16 control unit
18 conveying kneading segment
20 conveying device
22 paddle
24 cylinder envelope
26 inner edges of the tools of the second shaft
28 axis of rotation of the second shaft
30 axis of rotation of the first shaft
32 paddle surface
34 paddle surface plane
36 outer terminal edge of the paddle surface
38 inner terminal line
40 first radial beam angle α
42 further radial beam angle β
44 working surface
46 conveying kneading segment plane
48 inner terminal edge of the working surface
50 outer terminal edge of the working surface first angle of attack γ
52 first beam further angle of attack δ
54 further beam beam center angle ε
56 supports
57 recess in first fixation element
58 first fixation element
62 rotational direction first shaft
64 rotational direction second shaft
66 follower surface
A spacing paddle/conveying kneading segment

What is claimed is:

1. A continuous kneading apparatus (2) for kneading and mixing dough, the kneading apparatus comprising:
a kneading chamber (6) that is circumferentially at least section-wise delimited by a wall (4) that has an open discharge opening (8) for continuously discharging the kneaded dough from the kneading chamber (6) and a feed area (10) for filling the kneading chamber (6) with dough to be kneaded, the feed area (10) provided on a side of the kneading chamber (6) that is facing away from the discharge opening (8);
at least two motor-driven shafts (12, 14) on which tools (18, 22) are secured, wherein the tools are arranged in the kneading chamber (6), wherein the kneading chamber, the at least two motor driven shafts, and the tools are configured to convey dough in a continuous flow through the continuous kneading apparatus;

wherein at least one of the tools (18, 22) is configured to continuously convey dough from the feed area (10) in a conveying direction (20) toward the discharge opening (8);

a control unit (16) acting separately on the at least two shafts (12, 14) to adjust and change rotary speeds of the at least two shafts (12, 14) independently from each other to control kneading and conveying of dough in the kneading chamber;

wherein the at least two shafts (12, 14) include a first shaft and a second shaft, each furnished differently with the tools (18, 22) such that the conveying action of the totality of the tools (22) of the first shaft (12) in the form of a volume stream of the dough located in the kneading chamber (6) in the conveying direction (20) and/or the kneading action of the totality of the tools (22) of the first shaft (12) in the form of a volume stream of the dough located in the kneading chamber (6) in the direction toward the tools (18) of the second shaft (14) deviates from the conveying action and/or the kneading action of the totality of the tools (18) of the second shaft (14) when the first and second shafts (12, 14) rotate at the same rotary speed;

wherein the first shaft (12) and the tools (22) secured on the first shaft are arranged within an imaginary cylinder envelope (24), wherein inner edges (26) of the tools (18) of the second shaft (14) pointing toward the first shaft (12) are circulating on the imaginary cylinder envelope during a rotation about an axis of rotation (28) of the second shaft (14);

wherein the tools (22) of the first shaft (12) are formed by a plurality of paddles each provided with a paddle surface (32) that is moving the dough located in the kneading chamber (6) during a rotation about an axis of rotation of the first shaft (12);

wherein the paddles each have a length measured in a direction parallel to the axis of rotation of the first shaft and a height that is perpendicular to the length and is projecting away from the first shaft, wherein the paddles are connected lengthwise to the first shaft parallel to an axial direction of the first shaft;

wherein the paddles are arranged in a helical arrangement along the first shaft (12) so as to be displaced relative to each other in a circumferential direction of the first shaft and in the axial direction of the first shaft, wherein, viewed in the circumferential direction of the first shaft, the lengths of two neighboring paddles overlap partially, respectively, and movement paths of the paddle surfaces (32) of two neighboring paddles during a rotation about an axis of rotation (30) of the first shaft (12) overlap partially in the axial direction of the first shaft (12);

wherein the tools (18) of the second shaft (14) are formed by a plurality of conveying kneading segments that each have a working surface (44) moving the dough located in the kneading chamber (6) during a rotation of the second shaft (14) and that are arranged displaced relative to each other along the second shaft (14);

wherein the movement paths of the working surfaces (44) of two neighboring conveying kneading segments at least partially overlap during a rotation about the axis of rotation (28) of the second shaft (14);

wherein a spacing (A) between an outer terminal edge of the paddles and an inner terminal edge of the conveying kneading segments facing the outer terminal edge is 1.5 mm to 15.0 mm.

2. The kneading apparatus (2) according to claim 1, wherein the deviation of the conveying action of the totality of the tools (18) of the second shaft (14) is more than twice as high as the conveying action of the totality of the tools (22) of the first shaft (12) for the same rotary speed, respectively.

3. The kneading apparatus (2) according to claim 1, wherein the totality of the tools (18) of the second shaft (14) alone in summation have a conveying action.

4. The kneading apparatus (2) according to claim 1, wherein the axis of rotation (30) of the first shaft (12) coincides with the axis of rotation (28) of the second shaft (14).

5. The kneading apparatus (2) according to claim 4, wherein each paddle surface (32) is embodied so as to be positioned to at least 90% within the paddle surface plane (34).

6. The kneading apparatus (2) according to claim 4, wherein the paddle surface (32) is arranged to at least 90% parallel to the axis of rotation (30) of the first shaft (12).

7. The kneading apparatus (2) according to claim 1, wherein the working surface (44) of each conveying kneading segment is positioned to at least 90% in a conveying kneading segment plane (46).

8. The kneading apparatus (2) according to claim 1, wherein the inner terminal edge of the conveying kneading segments and an outer terminal edge (50) positioned opposite thereto and facing the wall (4) of the kneading chamber (6) are arc-shaped such that the conveying kneading segments in a projection onto a cross-sectional plane extending perpendicularly to the axis of rotation (28) of the second shaft (14) each have the shape of a sector of a circular ring, the sector defined by a circular center point and the circular arc-shaped inner and outer terminal edges (48, 50).

9. The kneading apparatus (2) according to claim 8, wherein:

the working surfaces (44) each have an incline relative to the axis of rotation (28) of the second shaft (14), wherein the incline is such that:

a first angle of attack y between the axis of rotation (28) of the second shaft (14) and a first(52) is between 90 degrees and 60 degrees, wherein the first line, in a projection onto a cross-sectional plane extending perpendicularly to the axis of rotation (28) of the second shaft (14), originates from the axis of rotation (28) of the second shaft (14) and in the conveying kneading segment plane (46) of the corresponding conveying kneading segment is positioned at the end of the working surface (44) facing away from the discharge opening (8);

a second angle of attack δ between the axis of rotation (28) of the second shaft (14) and a second line (54) is 30 degrees to 75 degrees, wherein the second line is originating in a projection onto a cross-sectional plane extending perpendicularly to the axis of rotation (28) of the second shaft (14) from the axis of rotation (28) of the second shaft and is positioned in the conveying kneading segment plane (46) of the corresponding conveying kneading segment;

wherein a beam center angle ε between the first line and the second line (54) in the projection of the lines (52, 54) onto the cross-sectional plane is 45 degrees to 90 degrees.

10. The kneading apparatus (2) according to claim 1, wherein the conveying kneading segments are shaped and arranged such that a ratio of the conveying action of the totality of the conveying kneading segments relative to their kneading action is 1 to 5.

11. The kneading apparatus (2) according to claim 10, wherein the ratio is 2.5 to 3.5.

12. The kneading apparatus (2) according to claim 1, wherein a ratio of a summation of the working surfaces (44) of the conveying kneading segments, in a projection onto a surface perpendicular to the conveying direction (20), relative to a summation of the paddle surfaces (32) of the paddles is 0.2 to 1.1.

13. The kneading apparatus (2) according to claim 12, wherein the ratio is 0.7 to 0.9.

14. The kneading apparatus (2) according to claim 1, wherein a projection of the paddle surfaces (32) onto a plane perpendicular to the conveying direction (20) during a complete rotational movement about the axis of rotation (30) of the first shaft (12) results in a shape of a circular ring, wherein a ratio of a summation of the working surfaces (44) of the conveying kneading segments, in a projection onto the plane perpendicular to the conveying direction (20), relative to the surface of the circular ring is 0.2 to 1.1.

15. The kneading apparatus (2) according to claim 14, wherein the ratio is 0.7 to 0.9.

16. The kneading apparatus (2) according to claim 1, wherein the spacing (A) is 5.0 mm to 10.0 mm.

17. The kneading apparatus (2) according to claim 1, wherein the deviation of the conveying action of the totality of the tools (18) of the second shaft (14) is more than nine times as high as the conveying action of the totality of the tools (22) of the first shaft (12) for the same rotary speed, respectively.

18. The kneading apparatus (2) according to claim 1, wherein the length and the height define a paddle surface plane extending parallel to the axis of rotation of the first shaft, wherein the paddle surfaces of the paddles extend to 90% within the paddle surface plane, respectively.

\* \* \* \* \*